US008498643B2

(12) United States Patent
Tu (10) Patent No.: US 8,498,643 B2
(45) Date of Patent: Jul. 30, 2013

(54) METHOD AND APPARATUS FOR CELL HANDOFF

(75) Inventor: Yue Tu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 13/251,773

(22) Filed: Oct. 3, 2011

(65) Prior Publication Data

US 2012/0021745 A1   Jan. 26, 2012

Related U.S. Application Data

(63) Continuation of application No. 12/265,702, filed on Nov. 5, 2008, which is a continuation of application No. PCT/CN2007/001742, filed on May 31, 2007.

(30) Foreign Application Priority Data

Jul. 5, 2006   (CN) .......................... 2006 1 0100263

(51) Int. Cl.
H04W 36/00       (2009.01)
(52) U.S. Cl.
USPC ........... 455/436; 455/423; 455/437; 455/439; 455/447; 455/442; 370/331; 370/329; 370/322; 370/341; 370/348
(58) Field of Classification Search
USPC ............... 455/442, 450, 439, 436–438, 423, 455/432.1; 370/331, 464, 252, 278, 329
See application file for complete search history.

(56) References Cited

U.S. PATENT DOCUMENTS

| 6,442,389 | B1 | 8/2002 | Marcum | |
|---|---|---|---|---|
| 6,445,917 | B1 | 9/2002 | Bark et al. | |
| 6,819,927 | B1 | 11/2004 | Sato | |
| 6,845,238 | B1 * | 1/2005 | Muller | 455/436 |
| 7,047,003 | B2 * | 5/2006 | Sako et al. | 455/423 |
| 7,184,710 | B2 * | 2/2007 | Hogan | 455/67.11 |
| 7,245,919 | B2 * | 7/2007 | Lau et al. | 455/450 |
| 7,489,930 | B2 * | 2/2009 | Aerrabotu et al. | 455/439 |

(Continued)

FOREIGN PATENT DOCUMENTS

| CN | 1223775 A | 7/1999 |
|---|---|---|
| CN | 1110215 C | 5/2003 |

(Continued)

OTHER PUBLICATIONS

International Search Report, PCT/CN2007/001742, Date of Mailing: Aug. 16, 2007, 7 pages.
English Translation of the Written Opinion of the International Searching Authority, PCT/CN2007/001742, Date of Mailing: Aug. 16, 2007, 4 pages.
English Translation of the International Preliminary Report on Patentability, PCT/CN2007/001742, Date of issuance: Jan. 6, 2009, 5 pages.

(Continued)

Primary Examiner — Kiet Doan
Assistant Examiner — Michael T Vu (57) ABSTRACT

A method for handoff between cells in a communication system includes the network sends a cell individual offset preset for a cell in the active set relative to each of its neighboring cells respectively to a terminal; after measuring the cell in the active set and its neighboring cells, the terminal evaluates the measurement in accordance with the measurement result and the cell individual offset for the cell in the active set relative to its each neighboring cell; the terminal then submits a measurement report to the network in accordance with the measurement evaluation result; the network instructs the terminal to perform a handoff between cells in accordance with the measurement report.

6 Claims, 3 Drawing Sheets

U.S. PATENT DOCUMENTS

| | | | |
|---|---|---|---|
| 7,499,701 | B2 | 3/2009 | Salonaho et al. |
| 7,616,956 | B2 | 11/2009 | Olvera-Hernandez et al. |
| 7,986,661 | B2 * | 7/2011 | Bhattacharjee et al. ...... 370/329 |
| 2004/0032845 | A1 | 2/2004 | Chen |
| 2005/0043046 | A1 | 2/2005 | Lee |

FOREIGN PATENT DOCUMENTS

| | | |
|---|---|---|
| CN | 1437803 C | 8/2003 |
| CN | 1589582 A | 3/2005 |
| CN | 1784078 | 6/2006 |
| CN | 1878419 A | 12/2006 |
| CN | 100466843 C | 3/2009 |
| EP | 1499147 A1 | 1/2005 |
| WO | 03036837 A1 | 5/2003 |
| WO | 2006066605 A1 | 6/2006 |

OTHER PUBLICATIONS

English Translation of the Russian Office Action dated Apr. 12, 2010, Application No. 2009103782/09 (004946), 3 pages.
Chinese office action for Chinese application No. 200610100263.5, dated Feb. 1, 2008, and an English translation thereof, 9 pages.
Chinese office action for Chinese application No. 200780000367.1, dated May 24, 2010, and an English translation thereof, 13 pages.
European Search Report for European Patent Application No. 07721315.5, date Nov. 3, 2009, 7 pages.
Office action of corresponding U.S. Appl. No. 12/265,702, mailed on Jan. 26, 2012, 14 pages total.

* cited by examiner

METHOD AND APPARATUS FOR CELL HANDOFF

CROSS REFERENCE TO RELATED APPLICATIONS

This application is a continuation of U.S. patent application Ser. No. 12/265,702, filed on Nov. 5, 2008, which is a continuation of International Patent Application No. PCT/CN2007/001742, filed on May 31, 2007. The International Application claims priority to Chinese Patent Application No. 200610100263.5, filed on Jul. 5, 2006. The afore-mentioned patent applications are hereby incorporated by reference in their entireties.

FIELD OF THE INVENTION

The present invention relates to the field of mobile telecommunications, and in particular, to a method and apparatus for handoff between cells in a mobile telecommunication system.

DESCRIPTION OF RELATED ART

In a cellular mobile communication system, when a terminal, e.g., a User Equipment (UE) moves from one cell to another, the terminal needs to be handed off from the cell it originally resided in to the cell it newly enters. Through the handoff, the location of the terminal and the resource the terminal uses are updated.

Handoff is the most important part in mobility management. It refers to a process in which a link between an original sector and the terminal is replaced by a link between a new sector and the terminal when the terminal approaches the edge of an original serving cell and is to enter another serving cell.

In a Wideband Code Division Multiple Access (WCDMA) network, for example, the handoff during a call may be categorized into hard handoff, soft handoff (handoff between cells in different Node Bs) and softer handoff (handoff between sectors in the same Node B), depending on the connection between the terminal and the network, release of the connection and frequency utilization.

Soft Handoff (SHO) means that the terminal does not disconnect from an original Node B when the terminal needs to communicate with a new Node B. In other words, during a handoff between the coverage edges of two or more Node Bs, the terminal first establishes a connection with a new cell by using a same frequency before disconnecting with the original cell, and receives signals from several Node Bs at the same time until certain conditions are met. During the handoff, the terminal communicates with all candidate Node Bs at the same time over a traffic channel (TCH).

The advantage of soft handoff is that it keeps communications uninterrupted when the terminal is crossing a cell edge, which greatly reduces call drops caused by handoff. In addition, soft handoff enables a selective combination of uplink signals and a maximal combination of downlink signals, which further improves the performance of radio links.

Soft handoff in the WCDMA network involves a pilot channel and a cell set. The WCDMA system uses a pilot channel to access and handoff to a channel. The terminal identifies the strongest signal by processing the pilot channel.

The WCDMA system uses the m sequence (short PN code) to modulate the pilot channel. The time offsets of the PN code in different pilots are different, and the offset between two neighboring pilots is 64 chips. The terminal differentiates cells by identifying the offset.

There are three types of cell sets in the WCDMA system: active set, monitor set and detect set.

1. Active set: a collection of cells corresponding to the traffic channels to which the terminal is currently connected.

2. Monitored set: the cells in a monitor set do not belong to the active set but are configured as neighboring cells to the cells in the active set and are sent to the terminal by included in a measurement control message.

3. Detected set: the cells in a detected set neither belong to the active set nor being configured as adjacent cells of the cells in the active set. These cells are not included in a measurement control message.

During a handoff, the terminal often evaluates handoff events in terms of quality.

During the evaluation, a cell individual offset (CIO) is added as an offset value to a cell measurement quality so that the evaluation of handoff event can be more accurate. For each cell in a monitored set, there can be set a cell individual offset. This offset can be either positive or negative. It is add as an offset value to the cell measurement quality when the terminal performs a handoff event evaluation.

Figure 1:
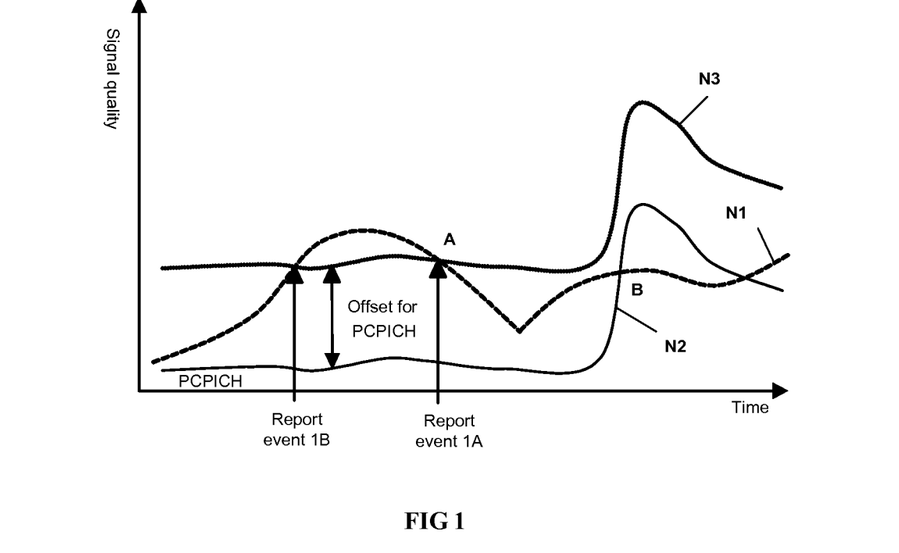
FIG. 1 shows an application of the cell individual offset in a soft handoff according to prior art.

As shown in FIG. 1, the dotted curve N1 denotes a threshold for triggering event 1A, the curve N2 indicates the actual signal quality of the primary common pilot channel (PCPICH) of a cell and the curve N3 denotes the threshold after a cell individual offset is added to the actual signal quality of the PCPICH of the cell.

It can be seen from FIG. 1 that, if no cell individual offset is configured, event 1A is triggered at point B instead of at point A. In general, a telecom operator detects a sharp rise of signal quality of a cell in advance by, e.g., a drive test and configures a positive cell individual offset so that event 1A can be triggered in advance and that a cell is added to an active set in time.

In some special scenarios in an actual network, for example, at a street corner or an overhead viaduct, the signal strength of a cell may change suddenly. Therefore, to timely trigger a handoff or avoid unnecessary handoff, it is very important to correctly configure the cell individual offset.

In the prior art, the cell individual offset is configured in allusion to a cell per se. Each cell has one unique cell individual offset. Once the cell individual offset for a cell is configured, it will not change. This unique offset, however, can result in such a problem that the unique cell individual offset for a cell does not apply to all adjacent cells of this cell. For example, assume that cells 1, 2 and 3 are intra-frequency neighboring cells each other, the cell individual offset for cell 1 is set to 3 dB which may intend to optimize the handoff from cell 2 to cell 1 in, e.g., a corner scenario, so that the handoff can be triggered timely. Regarding the handoff from cell 3 to cell 2, however, there is no such a scenario of corner and thus, it is not required to use a cell individual offset for triggering the handoff timely.

In addition, when a cell is added to or removed from an active set, the information of intra-frequency neighboring cells or inter-system neighboring cells needs to be modified accordingly. In this case, the network needs to re-send an updated measurement control message including the added and/or removed neighboring cells, to a terminal. Because the cell individual offset is configured in allusion to a cell itself and is unique, the information of those unchanged cells and the cell individual offset for them do not change even when adjacent cells are added or removed. The unchanged unique cell individual offset for these unchanged cells, however, may be unsuitable for the added adjacent cells.

During the implementation of the present invention, the inventor realized at least the following problems in the prior art: the unique cell individual offset configured for a cell per ser may do not apply to all adjacent cells of the cell. Furthermore, the unchanged cell individual offset cannot reflect the actual change of a cell. Therefore, a handoff event evaluation is not accurate enough in the prior art.

SUMMARY

Embodiments of the present invention provide methods and apparatus for handoff between cells so that the evaluation on handoff events during handoff can be more accurate.

Sending, by a network, to a terminal a cell individual offset of a cell in an active set relative to each adjacent cell preconfigured by the network; by the terminal, measuring the active set cell and its adjacent cell and evaluating of the measurement in accordance with a measurement result and the cell individual offset of the active set cell with respective to each adjacent cell; submitting, by the terminal, a measurement report to the network according to the result of the measurement evaluation; and instructing, by the network, the terminal to perform a handover between cells in accordance to the measurement report.

A network controller provided in an embodiment of the present invention includes: an individual offset configuration module, adapted to configure a cell individual offset for each adjacent cell of an active set cell relative to the active set cell; an individual offset sending module, adapted to send the cell individual offset of a cell in active set relative to each adjacent cell configured by the configuration module to a terminal, wherein the terminal performs an evaluation of a cell measurement according to the cell individual offset and sends a measurement report; and a handoff instruction module, adapted to instruct the terminal to perform a handoff between cells in accordance with the measurement report from the terminal.

A terminal provided in an embodiment of the invention includes: an individual offset obtaining module, adapted to obtain from a network a cell individual offset of an active set cell relative to each of its adjacent cells; a measurement module, adapted to measure the active set and the adjacent cells; a measurement reporting module, adapted to submit a measurement report to the network in accordance with the result of the measurement evaluation, so that the network send a handoff instruction message to the terminal in accordance with the measurement report; and a handoff execution module, adapted to perform a handoff between cells in accordance with the handoff instruction message from the network.

In embodiments of the present invention, the cell individual offset is configured based on adjacent relationship between two cells, contrast to that one unique cell individual offset is set with respective to a cell per se in the prior art. The cell individual offset is set for each adjacent of a cell relative to the cell, instead of the configured unique offset for the cell itself in the prior. A terminal measures the cell and its adjacent cells, evaluates the measurement in accordance with corresponding cell individual offset, and submits a measurement report to the network in accordance with the measurement evaluation result. The network instructs the terminal to perform a handoff between cells according to the measurement report. Therefore, the handoff between cells can be more accurate and the handoff can be triggered in time and thus avoids unnecessary handoff. As a result, users can obtain a better experience.

DETAILED DESCRIPTION OF EMBODIMENTS

The present invention is described in detail in conjunction with the accompanying drawings and embodiments.

Embodiments of the present invention are described using a WCDMA system that supports the third generation (3G) radio mobile communication technology as an example in which the present can be employed. It should be noted, however, that the present invention also applies to other mobile communication systems, such as CDMA2000 system or time division-synchronous code division multiple access (TD-SCDMA) system of the 3G radio mobile communication technology. Further, it also applies to the second generation (2G) Narrowband Code Division Multiple Access (N-CDMA) communication system.

According to an embodiment of the present invention, the cell individual offset is configured by way of in allusion to adjacent cells in the WCDMA network. The network sends to a terminal a cell individual offset for an adjacent cell of an active set cell relative to the active set cell preconfigured by the network. Thus, the terminal can evaluate a cell measurement in conjunction with the offset after the cell measurement. By this way, the evaluation of handoff events can be more accurate and thus a handoff between cells can be more accurate. As a result, users can obtain a better experience.

Figure 2:
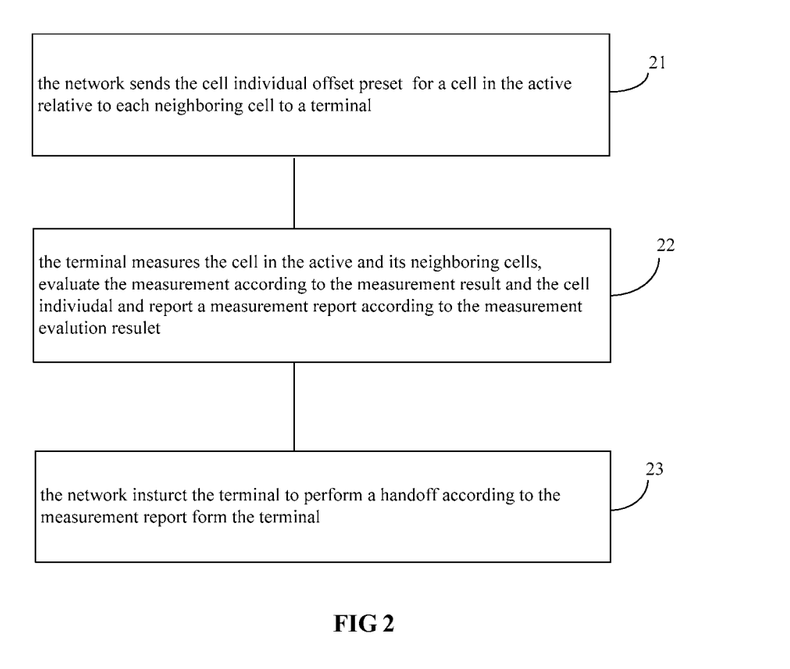
FIG. 2 shows a simplified flowchart of a method for handoff between cells according to an embodiment of the present invention.

FIG. 2 shows a simplified flowchart of the method for handoff between cells according to an embodiment of the present invention.

In block 21, the network sends a cell individual offset of a cell in an active set relative to its adjacent cell preconfigured by the network to the terminal.

For example, when the terminal accesses a cell initially, the network sends the cell individual offset of the initial cell relative to each adjacent cell to the terminal.

For each adjacent cell of each cell in the active set, the network may pre-configure a cell individual offset relative to the each active set cell. The network may set a cell individual offset for each intra-frequency or inter-system cell. The cell individual offset may be either positive or negative.

It should be noted that different adjacent cells of a cell each has such an independent cell individual offset relative to the cell. If the initial cell that the terminal enters is different, the cell individual offset of the initial cell relative to its each adjacent cell may also be different. For example, if cell 1 is a cell in the active set and cell 2 is a cell in a monitored set, the cell individual offset of cell 1 relative to cell 2 (cell 1->cell 2) may be set to X (dB); while if cell 3 is an active set cell and cell 2 is a monitored set cell, the cell individual offset of cell 3 relative to cell 2 (cell 3->cell 2) may be set to Y (dB). If both cell 2 and cell 3 are adjacent cells of cell 1 in the active set, the cell individual offset of cell 1 relative to cell 2 and the cell individual offset of cell 1 relative to cell 3 may be different from each other.

At the initial stage when a network is built, the cell individual offset may not be set (the terminal considers the cell individual offset to be 0 dB by default). During network optimization processes, such as drive test and radio frequency (RF) optimization, however, it may find such scenarios in which cell individual offset is required. In this case, the cell individual offset may be configured in accordance with the signals in actual scenarios. Subsequently, a second round of drive test and RF optimization is performed to check whether the cell individual offset is set properly.

When the terminal enters a cell initially, that is, the initial cell is the best cell, the network sends the CIO of this initial cell relative to its individual adjacent cell to the terminal by a measurement control mode, e.g., by an information element (IE) CELL INFO contained in a measurement control message sent from the network.

When the terminal enters a cell initially, this initial cell is the best cell. If the initial cell that the terminal enters is different, the cell individual offset of the initial cell relative to its each adjacent cell may also be different.

In block 22, the terminal measures on the active set cell and its adjacent cell(s), evaluates the measurement in accordance with the measurement result and the cell individual cell for the adjacent cell relative to the active set cell, and submits a measurement report in accordance with the evaluation result to the network.

In this block, the cell measurement is similar to prior art. The cells measured may include the cells in the active set and the cells in the monitored set. When the terminal accesses a cell initially, the cells measured may involve this initial cell and its adjacent cells. After the terminal enters the initial cell for a time period, there may be plural cells in the active set. In this case, the terminal also measures the plural cells in the active set and their adjacent cells.

Examples may be as follows.

If, during a time period ΔT of triggering a measurement report, the terminal measures that the pilot signal quality of a target cell in the monitored set or in a detected set fulfills the following formula (1) and the active set is not full, the target cell is added to a cell list of the active set of the terminal and marked as a cell to be added to the active set and a measurement report is submitted to the network. This event can be called as event 1A or radio link addition event. If the formula (1) is not fulfilled or the active set is full, the target cell still belongs to the monitored set.

$$10 \cdot Log M_{New} + CIO_{New} \geq \qquad (1)$$
$$W \cdot 10 \cdot Log\left(\sum_{i=1}^{N_A} M_i\right) + (1-W) \cdot 10 \cdot Log M_{Best} - (R_{1a} - H_{1a}/2),$$

where, $M_{New}$ is the measurement result of the pilot signal quality of the target cell.

$CIO_{New}$ is the cell individual offset of the active set cell where the terminal currently locates relative to the target cell, configured by network.

$M_i$ is the pilot signal quality of the active set cell.

$N_A$ denotes the number of cells in the active set.

$M_{Best}$ refers to the measurement result of the pilot signal quality of the best cell in the active set.

W is a weight parameter sent from the network to the terminal.

$R_{1a}$ is the report threshold of event 1A.

$H_{1a}$ is the hysteresis parameter for event 1A.

Similarly, if, within the time period ΔT of triggering a measurement report, the pilot signal quality of a target cell in the active set meets the following formula (2), this target cell is removed from the active set of the terminal and a corresponding measurement report is submitted to the network. This event is called as event 1B or radio link removal event. If the formula (2) is not fulfilled, this destination cell still belongs to the active set.

$$10 \cdot Log M_{Old} + CIO_{Old} \leq \qquad (2)$$
$$W \cdot 10 \cdot Log\left(\sum_{i=1}^{N_A} M_i\right) + (1-W) \cdot 10 \cdot Log M_{Best} - (R_{1b} + H_{1b}/2),$$

where, $M_{old}$ is the measurement result of the pilot signal quality of the destination cell.

$CIO_{New}$ is the cell individual offset of the best cell in the active relative to the target cell configured by the network.

$M_i$ is the pilot signal quality of in the active set cell.

$N_A$ denotes the number of cells in the active set.

$M_{Best}$ refers to the pilot signal quality of the best cell in the active set.

W is a weight parameter sent by the network to the terminal.

$R_{1b}$ is the report threshold of event 1B.

$H_{1b}$ is the hysteresis parameter of event 1B.

If, within a time period ΔT of triggering a measurement report, the pilot signal quality of a target cell in a monitored set meets the following formula (3) and the active set is full, replace the worst cell in the cell list of the active set of the terminal with this target cell and sends a measurement report to the network, This is called event 1C or radio link replacement event. If, however, the formula (3) is not fulfilled, this target cell still belongs to the monitored set.

$$10 \cdot Log\, M_{New} + CIO_{New} \geq 10 \cdot Log\, M_{InAS} + CIO_{InAS} + H_{1c}/2, \qquad (3)$$

Where, $M_{New}$ is the measurement result of the pilot signal quality of the target cell.

$CIO_{New}$ is the cell individual offset of the best cell in the active set relative to the target cell configured by the network.

$M_{InAS}$ is the measurement result of pilot signal quality of the worst cell in the active set.

$CIO_{InAS}$ is the cell individual offset, configured by the network, of the best cell relative to the worst cell in the active set.

$H_{1c}$ is the hysteresis parameter for event 1C.

Some parameters in formulas (1), (2) and (3) above are sent to the terminal by way of a measurement control mode. The terminal then performs cell measurement and reports corresponding events, including but not limited to the preceding three types of events, to the network in accordance with a evaluation for the cell measurement.

It can be seen from the preceding three formulas that the cell individual cell directly affects the result of the evaluation of events.

It can be understood that the evaluation conditions used for the terminal to evaluate the measurement in accordance with the cell individual offset for adjacent cell may be other conditions. For example:

If, during the time period ΔT, the following formula (4) is fulfilled and the active set is not full, the terminal submits a corresponding measurement report to the network and adds the target cell in the monitored set to the cell list for the active set of the terminal. This event is called event 1A or radio link addition event.

$$Pilot\_Ec/No+CIOnew>Best\_Pilot\_Ec/Io-Reporting\_range+Hysteresis\_event1A \quad (4)$$

If, within the time period ΔT, the following formula (5) is met, the terminal will submit a corresponding measurement report to the network and removes a cell in the active set from the list of the active set of the terminal. This event is called event 1B or radio link removal event.

$$Pilot\_Ec/No+CIOold<Best\_Pilot\_Ec/Io-Reporting\_range+Hysteresis\_event1B \quad (5)$$

If, within a time period ΔT, the formula (6) below is fulfilled and the active set is full, the terminal submits a corresponding measurement report to the network and uses the best cell in the monitored set to replace the worst cell in the list of cells of the active set of the terminal. This report event is also called event 1C or radio link replacement event.

$$Best\_Candidate\_Pilot\_Ec/No+CIOnew>Worst\_Old\_Pilot\_Ec/Io+CIOworst+Hysteresis\_event1C \quad (6)$$

The parameters in the formula (4)-(6) above are defined as follows.

Reporting_range denotes the threshold of soft handoff.
Hysteresis_event1A is the addition hysteresis.
Hysteresis_event1B denotes the removal hysteresis.
Hysteresis_event1C is hysteresis of replacement.
ΔT indicates the time for triggering a measure report.
Best_Pilot_Ec/Io denotes the best/highest value of pilots Ec/Io of all cells in the active set.
Worst_Old_Pilot_Ec/Io is the worst value of pilots Ec/Io of all cells in the active set.
Best_candidate_Pilot_Ec/Io is the best value of the pilots Ec/Io of all cells in the monitor set.
Pilot_Ec/Io: measured Ec/Io after filtering;
$CIO_{new}$, indicates the cell individual offset for the cell to be added to the active set relative to the best cell in the active set.
$CIO_{old}$ denotes the cell individual offset for the cell to be removed from the active set relative to the best cell in the active set.
$CIO_{old}$ is the cell individual offset of the worst cell in the active set relative to the best cell in the active set.

Where, some of the parameters above are sent to the terminal by way of measurement control mode. The terminal then performs cell measurement and reports corresponding event to the network in accordance with an evaluation of the measurement. It may be seen that the cell individual offset directly affects the result of evaluation on events.

In block 23, the network instructs the terminal to perform a handoff between cells according to the measurement report submitted by the terminal.

The network performs a handoff evaluation according to the measurement report. If a handoff condition is fulfilled, the network sends a handoff instruction message to the terminal. If a handoff condition cannot be fulfilled, the network does not process the measurement report.

The process of handoff between cells may be as follows.

The terminal sends a corresponding event measurement report to the network according to the event evaluation process described in block 22. For example, upon receiving an event 1A report from the terminal, the network performs a handoff evaluation and, if a handoff condition can be met, sends to the terminal a handoff instruction message including the information of a target cell for handoff. In response to receiving the handoff instruction message, the terminal adds the target cell to the active set, marks the target cell in the cell list of the active set as a cell that has been added to the active set, and returns a handoff completion message to the network. For another example, in response to receiving a event 1B report from the terminal, the network performs a handoff evaluation and sends to the terminal a handoff indication message containing the information of the target cell for handoff if a corresponding handoff condition can be met; upon receiving the handoff indication message, the terminal removes the target cell from the active set and responds a handoff completion message to the network.

The processing for other event reports is similar and therefore is not described in more detail here.

The adjacent cells of cells in the active set include the adjacent cell(s) of the best cell in the active and may also include the neighboring cells of other non-best active set cells. Therefore, in an embodiment of the present invention, if the best cell or any non-best cell in the active set changes, the network may adjust the cell individual offset for individual adjacent cell according to the change of the active set cell and sends the adjusted cell individual offset to the terminal.

Figure 3:
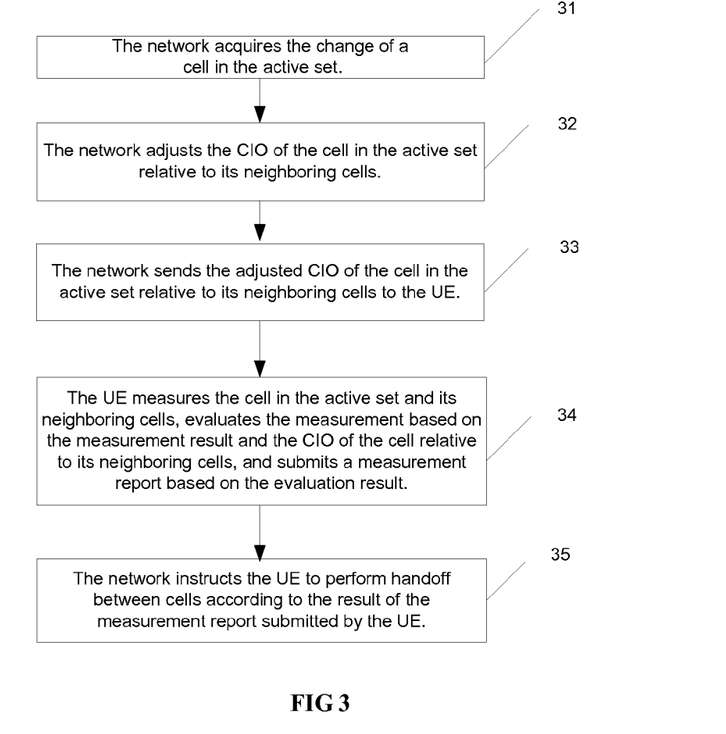
FIG. 3 shows a simplified processing flowchart after a change about a cell in the active set occurs.

FIG. 3 shows the process if a cell in the active set changes according to an embodiment of the present invention.

In block 31, the network acquires a change occurs on a cell in the active set.

The change about the cell in the active set may be a removal of a cell from the active set and/or a change of signal strength of the cell(s) in the active set.

The acquirement of the change about active set cell is the same as the prior art. Thus it is not described in detail in the embodiment of the present invention.

In block 32, the network adjusts the cell individual offset of the active set cell relative to adjacent cells.

In block 33, the network sends the adjusted cell individual offset to the terminal.

In block 34, the terminal measures the adjacent cell and its adjacent cells, evaluates the measurement according to the measurement result and corresponding cell individual offset, and submits a measurement report according to the evaluation result.

In block 35, the network instructs the terminal to perform a handoff between cells according to the measurement report from the terminal.

By way of examples, the follows describes the process of adjustment on the cell individual offset in response to the change of the cell(s) in the active set.

Scenario 1: Assuming cell A in a monitored set is a common neighboring cell of plural cells, e.g., cell 1, cell 2, in an active set.

When the signal strength of a cell in the active set changes, the adjustment of the cell individual offset for the monitored cell may be as follows.

If the network knows the signal quality of all active set cells, the network selects a cell having the best signal quality among the adjacent cells of cell A in the active set and sets the cell individual offset of the selected cell relative to cell A as a new cell individual offset for cell A. If the best cells are the same active set cell before and after the change of the signal strength, the network keeps the cell individual offset currently configured unchanged.

If the network does not know the signal quality of the cells in the active set, the network keeps the cell individual offset currently configured unchanged.

If a cell in the active set is removed, the adjustment on the cell individual offset for the monitored cell may be as follows:

If the network knows the signal quality of cells in the active set, the network selects, in the active set, a cell with the best signal quality among those adjacent cells of cell A and sets the cell individual offset of the selected cell relative to cell A as the new CIO for cell A. If the best cell before and after the removal of cell are the same, the network keeps the cell individual offset currently configured unchanged.

If the network does not know the signal quality of cells in the active set and the active set cell corresponding to the current cell individual offset is not removed (e.g., cell 1 in the active cell is not removed), the network keeps the cell individual offset currently configured unchanged. If the cell in the active set corresponding to the current cell individual offset is removed (e.g., cell 1 is removed), the network randomly selects an active set cell, e.g., cell 2, from those cells which are the adjacent cells of cell A and sets the cell individual offset of this randomly selected cell relative to cell A as the new cell individual offset for cell A.

It can be seen from the above that, regarding the network knows the signal quality of cells in the active set, if the signal strength of a cell in the active set changes or a cell is removed from the active set, the terminal measures the signal quality of the cells in the active set and reports the measurement result to the network. The network then selects in the active set a cell having the best signal quality among those adjacent cells of cell A and then sets the cell individual offset for cell A. More detail examples can be as follows.

For example, suppose there are three cells in the active set: cell 1, cell 2 and cell 3, and there is only one cell in the monitored set, cell A. Assuming that cell 1 is the best cell and cell A is a common adjacent cell of both cell 1 and cell 2 but not a adjacent cell of cell 3. In this case, For cell A, there are two cell individual offset values configured in the network, one is the cell individual offset of cell A relative to cell 1 (cell 1->cell A) and the other is the cell individual offset cell A relative to cell 2 (cell 2->cell A). The network, however, does not send both these two offset values to the terminal simultaneity. Because, as specified in the protocol, in such case, for one monitored cell (here for cell A), the network can send only one cell individual offset to the terminal for evaluating the signal quality of this monitored cell. In this example, the network sends the cell individual offset of cell 1 relative cell A (cell 1->cell A) to the terminal for evaluating the signal quality of cell A.

For another example, if the signal strength of a cell in the active set changes, the network selects a cell in the active set with the best signal quality from adjacent cells of cell A and takes the cell individual offset of the selected cell relative to cell A as the new offset for cell A. For example, if cell 2 has better signal quality than cell 1 has and cell 2 becomes the best cell in the active set, the cell individual offset of cell 2 relative to cell A is selected as the new CIO for cell A and sent to the terminal for evaluating the signal quality of cell A.

For further another example, assuming cell 3 in the active set becomes the best cell. In this situation, for cell A relative to cell 3, there is no such a cell individual offset because cell A is not an adjacent cell of cell 3. For cell A, however, it is still required to set a corresponding cell individual offset because cell A is still the adjacent cell of cell 1, cell 2 and still belongs to the monitored set. In this case, selects the one with better signal quality among cell 1 and cell 2 and sets the cell individual offset of the selected cell relative to cell A as the new cell individual offset for cell A and sent this new offset to the terminal. If the signal quality of cell 1 is still better than that of cell 2, keeps the cell individual offset currently configured unchanged.

For further another embodiment, if a cell in the active set is removed, the network selects, from other cells left in the active set, a cell with the best signal quality among those adjacent cells of cell A and sets the cell individual offset of the selected cell relative to cell A as the new cell individual offset for cell A. For example, if the original best cell, cell 1, is removed and cell 2 becomes the best cell, the network updates the new cell individual offset for cell A using the offset of cell 2 relative to cell A (cell 2->cell A) and sends the updated offset to the terminal. While if cell 1 is removed and cell 3 becomes the best cell, regarding cell 3 relative to cell A, there is no such a cell individual offset because cell A is not an adjacent cell of cell 3. For cell A, however, it is still required to have a cell individual offset because cell A is still the adjacent cell of cell 2 and thus still belongs to the monitored set. In this situation, sets the cell individual offset cell 2 relative to cell A as the new offset for cell A and sends the new cell individual offset for cell A to the terminal. If the cell with the best signal cell in the active set among those adjacent cells of cell A do not change before and after the removal of a cell, for example, if cell 3 is removed and the signal quality of cell 1 is still better than the signal quality of cell 2 has, then keep the cell individual offset currently configured unchanged. If the signal quality of cell 2 becomes better than that of cell 1, take the offset of cell 2 relative to cell A as the new cell individual offset for cell A and send the new cell individual offset to the terminal.

For another example, if cell 1 is the best cell and cell A is the adjacent cell of cell 2 and cell 3, when the signal strength of a active set cell changes or is removed, the network always selects a better one from cell 2 and cell 3 and takes the cell individual offset of the selected better cell relative to cell A as the new cell individual offset for cell A and sends it to the terminal for evaluating the quality of cell A.

2. Another scenario: If cell A in the monitored set is the adjacent cell of only one cell, e.g., cell 1, in the active set, the cell individual offset for cell A configured currently is that of cell A relative to cell 1. Because cell 1 is the only adjacent cell of cell A before and after the signal strength of a cell in the active set changes. Therefore, keeps the currently configured cell individual offset unchanged.

If a cell not cell 1 in the active set is removed, keeps the cell individual offset currently configured unchanged. If cell 1 is removed, then cell A does not belong to the monitored set. In this case, for cell A, it does not need to configure a cell individual offset for it.

In accordance with embodiments of the present invention, the cell individual offset is configured based on adjacent relation between two cells. For each adjacent cell of a cell, an independent cell individual offset is pre-configured relative to the cell by a network. The network sends the cell individual offset preconfigured for an adjacent cell of an active set cell to a terminal. The terminal evaluates on a cell measurement according to the cell measurement result and the cell individual offset and submits a measurement report to the network. The network performs a handoff evaluation according to the measurement report and instructs the terminal to perform a handoff between cells based on the evaluation result. Therefore, the negative impact on the handoff between cells caused by configuring a unique cell individual offset for each cell itself as the prior art can be avoided.

According to embodiments of the present invention, the cell individual offset is configured in allusion to adjacent cell. In an embodiment, if the signal strength of a cell in an active set change, the network adjusts the cell individual offset for adjacent cell of corresponding cell relative to the cell in real time based on the change of the signal quality accordingly. In another embodiment, if a cell is removed from the active set, the network adjusts the cell individual offset for the adjacent cell of a corresponding cell accordingly. By this way, the accuracy of cell measurement evaluation performed by the terminal can be further ensured. The handoff can be triggered in time and can avoid any unnecessary handoff, thus improving the handoff efficiency.

The method provided in the embodiments may applies to all handoff that may use a cell individual offset technology, including but not limited to intra-frequency and inter-system handoff, which may be soft handoff, softer handoff, or hard handoff.

According to other embodiments of the present invention, a terminal and a network controller are provided.

Figure 4:
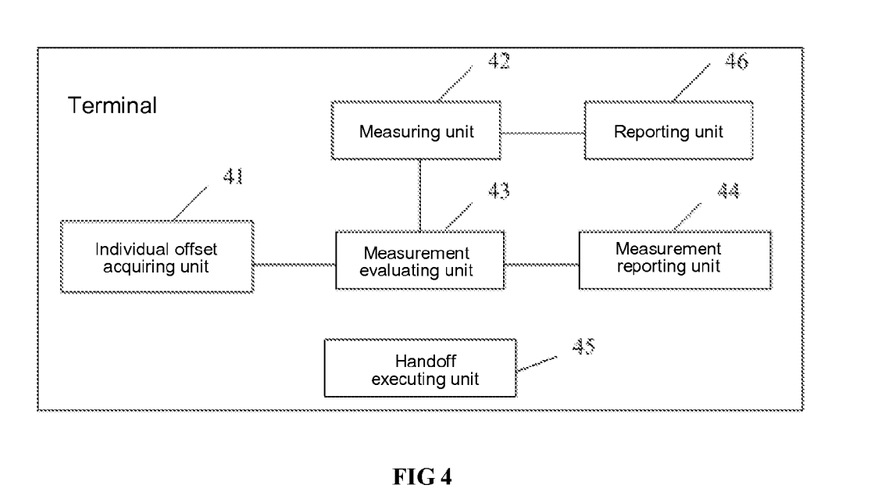
FIG. 4 shows a simplified block diagram of a terminal according to an embodiment of the present invention.

FIG. 4 is a simple block diagram of a terminal provided in an embodiment of the present invention.

Please refer to FIG. 4, the terminal includes an individual offset acquiring module 41, a measurement module 42, a measurement evaluating module 43, a measurement reporting module 44 and a handoff execution module 45. As an example, the terminal may further include a reporting module 46. The individual offset acquiring module 41 is adapted to obtain the cell individual offset of an active set cell relative to each of its neighboring cells from the network. The measurement module 42 is adapted to measure the active set cell and its neighboring cells. The measurement evaluating module 43 is adapted to perform an evaluation of the measurement according to the measurement result provided by the measuring module 42 and the cell individual offset. The measurement reporting module 44 is adapted to submit a measurement report to the network in accordance with the result of measurement evaluation performed by the measurement evaluating module 43, so that the network can send a handoff instruction message to the terminal according to the measurement report. The handoff execution module 45 is adapted to perform a handoff between cells according to the handoff instruction message from the network.

For the measurement evaluation performed by the measurement evaluating module 43 in accordance with the measurement result provided by the measuring module 42 and the cell individual offset, it can refer to the corresponding description provided in the above method embodiments of the present invention.

The terminal provided, according to another embodiment of the present invention, further includes a reporting module 46, which is adapted to measure the signal quality of the cell(s) in the active set and to report the measurement to the network in response a change about the cell in the active set. By this way, the network can know the change of the cell in the active set based on the signal quality of cell and, thus, adjusts the cell individual offset of an active set cell relative to each corresponding neighboring cell according to the signal quality change and sends the adjusted offset to the terminal.

Figure 5:
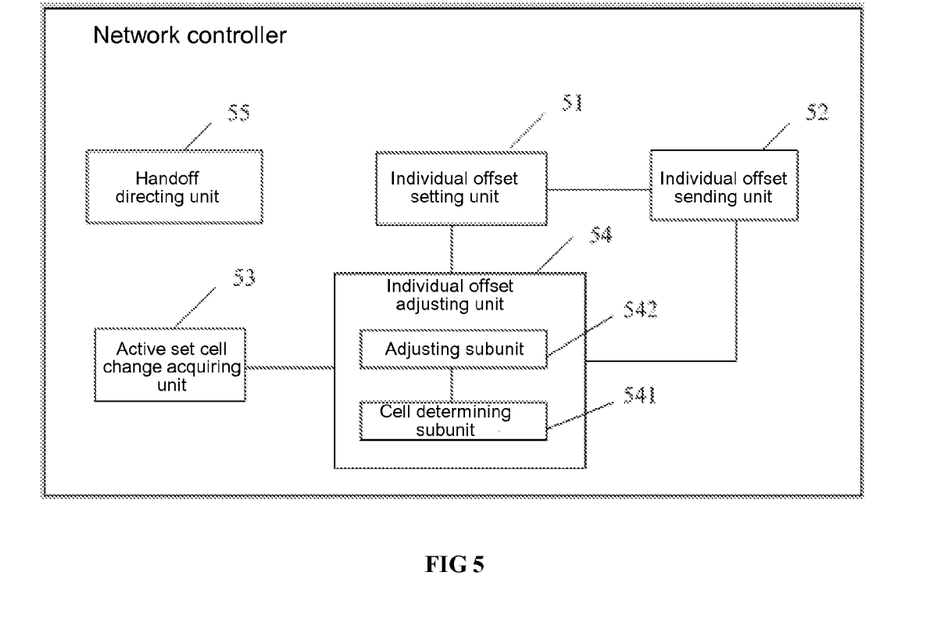
FIG. 5 shows a simplified principle block diagram of a network controller according to an embodiment of the present invention.

FIG. 5 shows a simple block diagram of a network controller provided in an embodiment of the present invention. Refer to FIG. 5, the network controller includes an individual offset configuration module 51, an individual offset sending module 52 and a handoff instruction module 55. The individual offset configuration module 51 is adapted to configure a cell individual offset of an active set cell relative to its each adjacent cell. For each different adjacent cell of a cell, there is such an independent cell individual offset relative to the cell preconfigured by the configuration module. The individual offset sending module 52 sends the cell individual offset of an active set cell relative to each of its adjacent cells to a terminal. The terminal then evaluates a cell measurement and submits a measurement report to the network. For example, when the terminal enters a cell initially, the individual offset sending module 52 sends the cell individual offset of this initial cell relative to each of its adjacent cells to the terminal. After the terminal enters the initial cell, if the original cell(s) in the active set changes, the network controller adjusts the cell individual offset for each adjacent cell correspondingly based on the change. In this case, the individual offset sending module 52 sends the adjusted cell individual offset of active set cell relative to its each adjacent cell to the terminal so as to ensure the correction and veracity of the cell individual offset. The handoff instruction module 55 instructs the terminal to perform a handoff between cells according to the measurement report from the terminal.

According to an embodiment of the present invention, in order to enable the terminal to obtain a proper cell individual offset upon the change on the cell in the active set, the network controller may further includes an active set cell change acquiring module 53 and an individual offset adjustment module 54. The active set cell change acquiring module 53 is adapted to acquire the change about the active set. The individual offset adjustment module 54, in response to the change of the active set cell, adjust the cell individual offset for the adjacent cell of corresponding active set cell and send the adjusted cell individual offset to the individual offset sending module 52. The individual offset sending module 52 sends the adjusted cell individual offset to the terminal.

The change about the active set cell may be caused by a removal of a cell from the active set, or a change of the signal strength of an active set cell. For this change about the active set, the network or the terminal may re-determine the cells in the active set caused by the change. As shown in FIG. 5, in an embodiment of the present invention, the individual offset adjustment module 54 includes a cell determining sub-module 541 and an adjustment sub-module 542. The cell determining sub-module 541, in response to the change about the active set, determine a cell in the active set with the best signal quality among those adjacent cells of a cell in a monitored set according to the signal quality reported by the terminal. The adjusting sub-module 542 sets the cell individual offset of the determined cell with the best signal quality relative to the monitored set cell as the offset for the monitored set cell and sends the cell individual offset to the individual offset sending module 52. For the adjustment of the cell individual offset performed by the adjustment sub-module 542, it can be referred to the corresponding description of the method according to the preceding embodiments of the present invention.

It can be seen that the terminal and the network controller provided in embodiments of the present invention can eliminate the negative and adverse effect on the handoff between cells caused by, for each cell, configuring only one unique cell individual offset in allusion to the cell itself in the prior art and thus, handoff between cells can be more accurate. Therefore, in turn, users can obtain a better experience.

Although the invention has been described by exemplary embodiments, it should be noted that the invention is not limited to such embodiments. Those skilled in the art will readily observe that various modifications and alterations of the embodiment may be made without departing from the spirit and scope of the invention while retaining the teachings of the invention. The invention is intended to cover those modifications and alterations provided that they fall within the scope of protection defined by the following claims or their equivalents.

What is claimed is:

1. A method for handoff between cells, comprising:
    obtaining a cell individual offset for an adjacent cell of an active set cell, wherein the cell individual offset is configured by a network controller based on adjacent relationship between the active set cell and the adjacent cell;
    measuring the active set cell and the adjacent cell;
    evaluating the cell measurement according to a result of the cell measurement and the cell individual offset, comprising: if, during a time period $\Delta T$ of measurement report triggering, the pilot signal quality of a target cell in a monitored set meets a condition for adding a cell and the active set is not full, adding the target cell to a cell list of the active set of the terminal and marking the target cell as a cell to be added to the active set;
    submitting a measurement report to the network controller according to a result of the measurement evaluation; and
    receiving an instruction, from the network controller, to perform handoff, wherein the instruction is made by the network controller according to the measurement report.

2. The method of claim 1, further comprising:
    receiving an adjusted cell individual offset from the network controller, wherein the adjusted cell individual offset is adjusted by the network controller according to a change about the active set.

3. The method of claim 2, further comprising:
    measuring cell signal quality of the active set in response to the change about the active set; and
    sending the measured cell signal quality to the network controller for adjusting the cell individual offset.

4. A terminal, comprising:
    an obtaining module, adapted to obtain from a network controller a cell individual offset for an adjacent cell of an active set cell, wherein the cell individual offset is configured by a network controller based on adjacent relationship between the active set cell and the adjacent cell;
    a measurement module, adapted to measure the active set cell and the adjacent cell;
    a measurement evaluation module, adapted to evaluate the cell measurement according to a result of the cell measurement and the cell individual offset, comprising: if, during a time period $\Delta T$ of measurement report triggering, the pilot signal quality of a target cell in a monitored set meets a condition for adding a cell and the active set is not full, adding the target cell to a cell list of the active set of the terminal and marking the target cell as a cell to be added to the active set;
    a measurement report module, adapted to send a measurement report to the network controller according to the result of the measurement evaluation; and
    a handoff execution module, adapted to perform a handoff between cells according a handoff instruction sent by the network controller.

5. The terminal of claim 4, further comprising:
    a module, adapted to, in response to a change about the active set, measure signal quality of the cell in the active set and sending the measured signal quality to the network controller.

6. The terminal of claim 4, wherein the change about the active set includes a removal of a cell from the active set or a change of signal quality of a cell in the active set.

* * * * *